US006311734B1

(12) United States Patent
Petrovic

(10) Patent No.: US 6,311,734 B1
(45) Date of Patent: Nov. 6, 2001

(54) SHOWERHEAD SECURITY COVER

(75) Inventor: John E. Petrovic, Hillsdale, MI (US)

(73) Assignee: Alsons Corporation, Hillsdale, MI (US)

( * ) Notice: Subject to any disclaimer, the term of this patent is extended or adjusted under 35 U.S.C. 154(b) by 0 days.

(21) Appl. No.: 09/438,861

(22) Filed: Nov. 12, 1999

(51) Int. Cl.[7] ........................................... F16L 57/00
(52) U.S. Cl. .................. 138/110; 138/162; 138/166; 4/605; 285/45
(58) Field of Search ................... 138/110, 162, 138/166; 4/609, 605; 285/45, 921

(56) References Cited

U.S. PATENT DOCUMENTS

| 968,759 | * | 8/1910 | Fogg | 285/45 |
|---|---|---|---|---|
| 1,587,327 | * | 6/1926 | Johnson | 138/110 |
| 3,578,026 | * | 5/1971 | Meyer, Jr. | 138/110 |
| 4,219,693 | * | 8/1980 | French | 174/135 |
| 4,372,593 | * | 2/1983 | Kesselman | 292/307 B |
| 4,405,161 | * | 9/1983 | Young et al. | 285/45 |
| 4,426,108 | * | 1/1984 | Kesselman | 292/307 B |
| 4,600,220 | * | 7/1986 | Agnelli | 285/45 |
| 4,826,215 | * | 5/1989 | Sullivan | 285/80 |
| 5,158,114 | * | 10/1992 | Botsolas | 138/110 |
| 5,531,695 | * | 7/1996 | Swisher | 604/111 |
| 5,709,249 | * | 1/1998 | Okada et al. | 138/162 |
| 5,905,231 | * | 5/1999 | Houte et al. | 138/165 |

\* cited by examiner

*Primary Examiner*—James Hook
(74) *Attorney, Agent, or Firm*—Myron B. Kapustij; Lloyd D. Doigan

(57) ABSTRACT

The showerhead security cover prevents unauthorized access to a connector of a shower assembly. The connector secures the showerhead to the shower arm, the connector, showerhead, and shower arm being standard without any modification required. The showerhead security cover comprises a housing and a lock. The lock is integral with the housing. Once the lock is engaged, the housing encases the connector and prevents access to the connector. Once the lock is engaged, there is no substantial rotational movement of the connector relative to the shower arm. One end wall of the housing seats against an end of the connector during engagement preventing any substantial axial movement of the connector relative to the connector. The housing is strong enough to prevent engagement with the connector even when the housing is grasped with pliers. Disengagement is enabled by the use of a special tool to allow authorized access to the connector.

19 Claims, 3 Drawing Sheets

SHOWERHEAD SECURITY COVER

FIELD OF ART

This invention relates generally to showerhead assemblies, and more particularly, to showerhead security covers to minimize the theft of such showerhead assemblies.

BACKGROUND OF THE INVENTION

Conventional showerheads are at risk of being removed and stolen from hotels and other public places. Several attempts have been made to address this problem.

U.S. Pat. No. 4,133,350 (Nelson) discloses a tamper-resistant flow control attachment for a shower arm. One end of the attachment is threadedly engaged with the shower arm and the other end is threadedly engaged with the showerhead. During installation of the shower arm and showerhead, the attachment is inserted between the shower arm and the showerhead. The attachment comprises a two-piece assembly—a housing and a shell. The attachment includes a first setscrew to prevent rotation of the housing relative to the shower arm and a second setscrew, which limits any axial movement of the shell. The housing and the shell each encase the showerhead volumetric flow control device to limit the water flow through the showerhead to a predetermined level. However, the attachment complicates showerhead assembly and requires the disassembly of existing showerheads in order to insert the attachment into the line. Also, the attachment can be used only with specific showerhead configurations, or requires the modification of the shower arms or showerheads.

U.S. Pat. No. 3,826,429 (Moen) and U.S. Pat. No. 3,997,116 (Moen) disclose variations of tamper-proof showerhead assemblies. The assemblies are mounted between the swivel ball and the shower body member, a sleeve encasing the shower body member. The one-piece body, one-piece sleeve, and shower handle are secured together in such a manner that no part of the assembly can be removed without removing the entire showerhead from its supporting conduit. However, the connector portion of the swivel ball and the shower arm are not encased by the assembly, enabling direct access to the connector and removal of the showerhead assembly.

In addition, there are other prior art references in a similar but non-related application directed at preventing the removal of conventional hoses—see for example U.S. Pat. No. 5,176,014 (Erickson), U.S. Pat. No. 5,033,280 (Johnson), and U.S. Pat. No. 4,803,858 (Parker). These devices generally surround the connector between the faucet and the hose and include a distinct lock to prevent access to the connector.

What is needed is a showerhead security device specifically designed for showerheads that covers the connector between the shower arm and the showerhead preventing direct access thereto, that is compatible with essentially all conventional showerhead designs, that is a deterrent to any unauthorized removal thereof, that indicates when any unauthorized access has been attempted, and that has component parts that are of a relatively simple design and easy to make from conventional materials.

What is needed is a showerhead security device for showerheads that enables removal with the use of a special tool, that is strong enough to resist gripping by conventional pliers, that is easy to install not requiring disassembly to the shower arm from the showerhead in existing units, that is capable of snap closure assembly, and that the only method of access to the showerhead connector is by mutilation of the device.

SUMMARY OF THE INVENTION

Various preferred embodiments of the showerhead security covers of the present invention as hereafter described meet each or all of the above-identified needs. The preferred embodiments of the showerhead security cover of the present invention prevent unauthorized access to a connector of a shower assembly during engagement. The connector as used herein, includes any device, conventional or otherwise, that secures the showerhead to the shower arm. Preferably, the connector, showerhead, and shower arm are standard without any modification required. The connector is attachable to a shower arm by a threaded retention therebetween, an external thread being generally disposed on the shower arm and an internal thread being generally disposed on the connector.

The showerhead security cover of the present invention comprises a housing and a lock-the lock being preferably integral with the housing enabling the showerhead security cover of the present assembly to be injection molded when plastic materials are used. Once the lock is engaged, the housing encases the connector and prevents access to the connector. During engagement, no substantial rotational movement of the connector relative to the shower arm is enabled, and one end-wall of the housing seats against an end-wall of the connector preventing any substantial axial movement of the housing relative to the connector. The housing is strong enough to prevent engagement with the connector even when the housing is grasped with pliers. Disengagement of the showerhead security cover of the present invention may be enabled by the use of a special tool that is generally accessible to maintenance personnel such as an allen wrench.

For a more complete understanding of the showerhead security cover of the present invention, reference is made to the following detailed description and accompanying drawings in which the presently preferred embodiments of the invention are shown by way of example. As the invention may be embodied in many forms without departing from the spirit of essential characteristics thereof, it is expressly understood that the drawings are for purposes of illustration and description only, and are not intended as a definition of the limits of the invention.

DETAILED DESCRIPTION OF THE DRAWINGS

FIG. 2b is an enlarged detail view of one of the shells of the showerhead security cover of FIG. 2a;

FIG. 3c is a left end view of the security cover shown in section in FIG. 3a;

FIG. 3d is a right end view of the security cover shown in section in FIG. 3a;

Figure 3C:
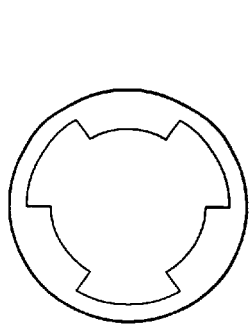
Figure 3A:
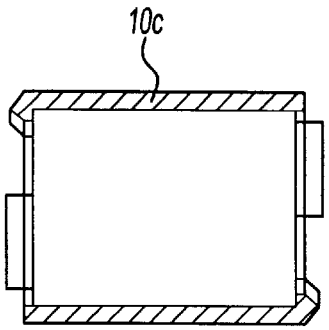
FIG. 3a is a sectional view of yet another preferred embodiment of the showerhead security cover of the present invention, the disclosure being both end views and a half-section view, the cover being one-piece and having snap-closure engagement on both end walls of the cover.
Figure 3D:
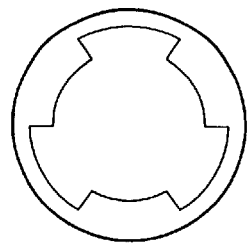
Figure 3E:
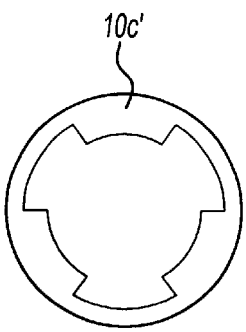
FIG. 3e is a left end view of the security cover shown in section in FIG. 3b.
Figure 3B:
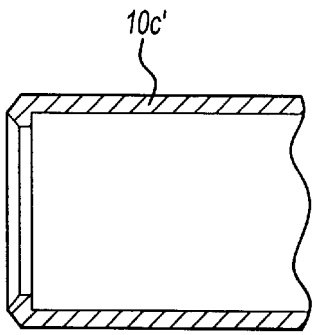
FIG. 3b is a sectional view of yet still another preferred embodiment of the showerhead security cover of the present invention, the disclosure being an end view and a half-section view, the cover being one-piece and having snap-closure engagement on only one end wall of the cover.
Figure 4A:
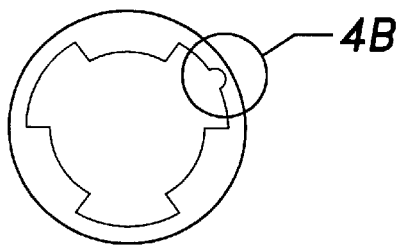
Figure 4B:
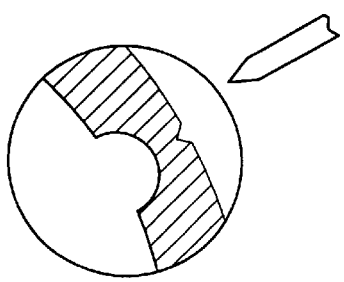
Figure 4C:
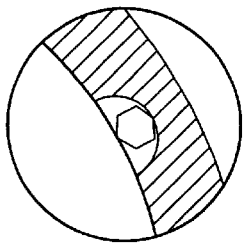

FIGS. 4a and 4b disclose a variation of the preferred embodiments of the showerhead security cover of FIGS. 3a and 3b, one wall of the security cover having a thinner section that can be cut by a sharp object for authorized removal of the cover from the connector; and FIG. 4c discloses another variation of the preferred embodiment of the showerhead security cover of FIGS. 3a and 3b, again one wall of the cover having a thinner section for enabling authorized removal by tearing of the cover from the connector along the thinner section.

DETAILED DESCRIPTION OF THE PREFERRED EMBODIMENTS

Referring now to the drawings, FIGS. 1a, 1b, 1c, 1d, and 1e disclose a first preferred embodiment of the shower security cover 10A of the present invention. The showerhead security cover 10A comprises housing 20A and a lock 40A, the lock 40A securely retaining the housing 20A about a connector 12.

The housing 20A comprises a pair of half shells 22A and 24A secured together by a living hinge 50. The two half shells 22A and 24A generally have a semi-circular cross-section. The half-shell configuration enables the showerhead security cover 10 of the present assembly to be applied onto an already installed showerhead unit 14 without requiring disassembly.

The housing 20A encases the connector 12 preventing access to the connector 12 during engagement. One end of the housing 20A has an end-wall 25 for retention about the downstream end-wall 15 of the connector 12. This engagement between the end-wall of the cover 10A and the downstream end-wall of the connector 12 prevents unauthorized access to the connector 12. Also, in another preferred embodiment of the showerhead security cover of the present invention, both end-walls of the cover 10A engage both end-walls of the connector preventing and significant axial movement of the cover 10A in either direction (see FIG. 3a for purposes of illustration). This retention prevents axial movement of the showerhead security cover 10A relative to the connector 12 after the cover 10A has been engaged.

There is sufficient tolerance between the housing 20A and the connector 12 enabling rotational movement of the housing 20A about the connector 12 during engagement. The cover 10A is strong enough that even when gripped with a pair of pliers rotational movement of the connector 12 is prevented.

The lock 40A that retains the two shells 22A and 24A together during engagement can be any conventional lock that is known in the art, or even a chemical adhesive such as an epoxy, glue, paste, adhesive or the like. However, in many of the preferred embodiment of the showerhead security cover 10A of the present invention, each lock 40A is integral with the housing 20A and includes a male fastener 42 and a female fastener 46. The male and female fasteners 42 and 46 are each disposed on opposing edges 44 and 48 of the two shells 22A and 24A, the edges 44 and 48 being coaxial with the axis of the housing 20A.

The male fastener 42 is integral with the wall of the first shell 22A and extends outward from a side edge 44, with a tongue 43 disposed near the end thereof. The female fastener 46 is integral with a side edge 48 on the opposing shell 24A, with a catch 47 disposed near the free end. The catch 47 comprises an opening within the side edge of the wall and has an elongated transverse aperture 49 near the distal end which is positioned to receive the tongue 43 in locking engagement when the two shells 22A and 24A are forced together. During closure of the two shells 22A and 24A, each tongue 43 snaps into engagement with the catch 47.

The tongue 43 is disposed on the end of each male fastener 42. The cross section of each tongue 43 has a triangular shape, and preferably a right triangle (see FIG. 1d). The tongue 43 has a sliding surface 51 (the hypotenuse of the triangle) and a retaining surface 53 (the shorter leg of the triangle).

Figure 1A:
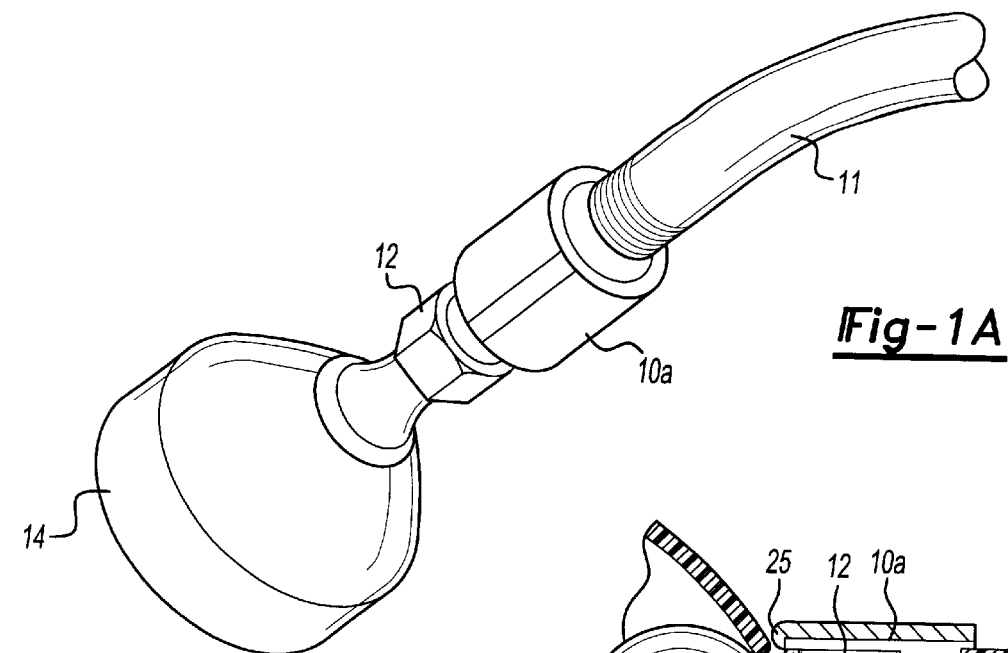
FIG. 1a is a perspective view of a first preferred embodiment of the showerhead security cover of the present invention with the shower unit and the shower arm, this embodiment of the cover includes a living hinge for engagement about a connector disposed between the shower unit and the shower arm.
Figure 1B:
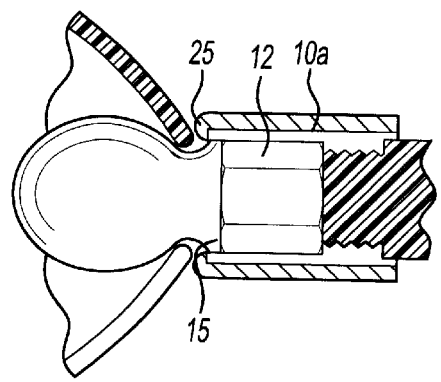
FIG. 1b is a cross-sectional view of the showerhead security cover of FIG. 1a with the shower unit and the shower arm.
Figure 1C:
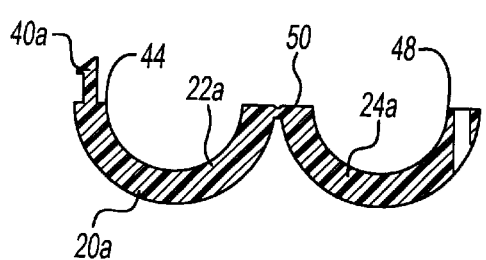
FIG. 1c is an end view of the showerhead security cover of FIG. 1a, the living hinge being in an open position.
Figure 1D:
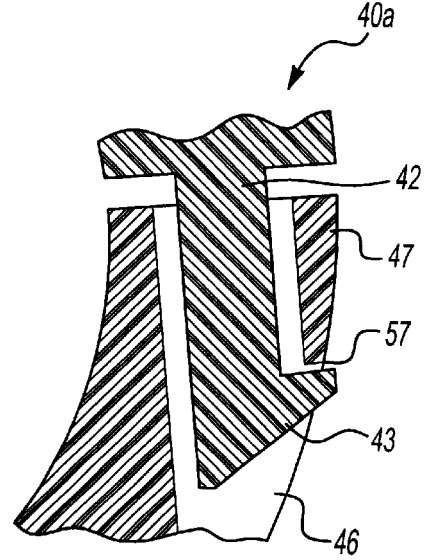
FIG. 1d is an exploded end view of the a preferred embodiment of the lock of the showerhead security cover of FIG. 1c.
Figure 1E:
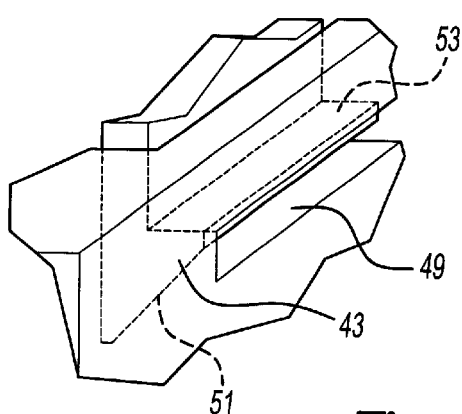
FIG. 1e is an exploded isometric view of the a preferred embodiment of the lock of the showerhead security cover of FIG. 1d in the engaged position.

As shown in FIG. 1e, when the tongue 43 is inserted into the catch 47, the sloped surface 51 flexes the tongue 43 radially into the aperture 49. Insertion of the tongue 43 into the catch 47 is complete when the retaining surface 53 of each tongue 43 is adjacent each respective retaining surface 57 of the catch 47. Retraction of the tongue 43 from the catch 47 is not enabled because of the locking force exerted by each of the retaining surface of the tongue 43 on each respective retaining surface 57 of the catch 47.

Snap closure is formed between the catch 47 formed on the outer edge 26 and of the first shell 22A and the tongue 43 formed on the outer edge 28 of the opposing shell 24A. When engaged, the tongue 43 extends into the aperture 49. Closure of the housing 20A is readily accomplished by pressing the one shell into the other forcing the tongue 43 into engagement with the catch 47.

Alternatively, the extreme forward end of the tongue 43 extends beyond the aperture to minimize the area of the member that can be contacted by a tool inserted through a hole from the outside of the housing 20A. Preferably, if a permanent engagement is required, whichever member has the greater flexibility to ensure the snap closure is disposed outside of the non-flexible member. This prevents release of the members by providing a hole in the housing wall and pushing a tool through the hole to unlatch the members. The opening may be disposed on the inner surface of the shell wall (not shown). A major disadvantage of this configuration is that engagement requires a thickening of the wall about the catch 47 requiring a more intricate injection molding process - see for example U.S. Pat. No. 4,426,108 (Kesselman).

The housing 20A is preferably made of a plastic, which is a good molding material and has living hinge 50 properties. The showerhead security cover 10A of the present invention when formed as a molded part can be clear, opaque or even chrome plated. Since the showerhead security cover includes various snap closures, the material is preferably one that can be readily injection molded and is a somewhat flexible, thermoplastic polymer material. One such material is polypropylene. Polypropylene is easily injection molded using standard procedures to produce the housing 20A of the present invention. The polypropylene provides the necessary strength in the walls of the showerhead security cover 10A to prevent unauthorized entry when used in sufficient thickness. The thickness of the walls is dictated by the degree of protection sought.

Polypropylene also has good living hinge properties. The physical properties of the plastic allow the hinge 50 to be bent without significantly weakening the strength of structure in the hinge area. However, the showerhead security cover 10A of the present invention is not restricted to polypropylene, or even plastics, as others materials such as metals may also be used. However, the use of a plastic material like polypropylene enables the showerhead security cover 10A to be injection molded in one step and in one piece. An alternative plastic material for the housing 20A is acrylonitrile butadiene styrene (ABS) which has adequate flexibility and can be readily electroplated to provide a metallic appearance that is similar to other plumbing components.

Figure 2A:
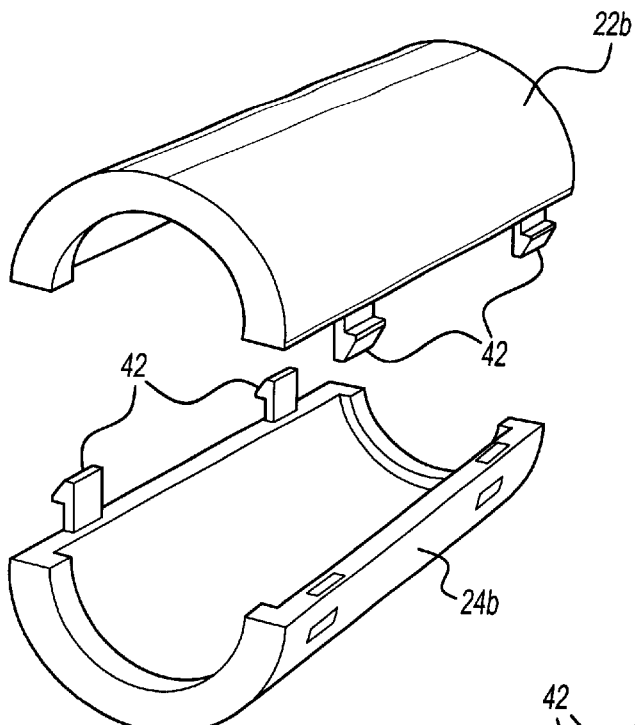
FIG. 2a is a perspective view of another preferred embodiment of a showerhead security cover of the present invention, the showerhead security cover having two shells and a snap-closure engagement mechanism.
Figure 2B:
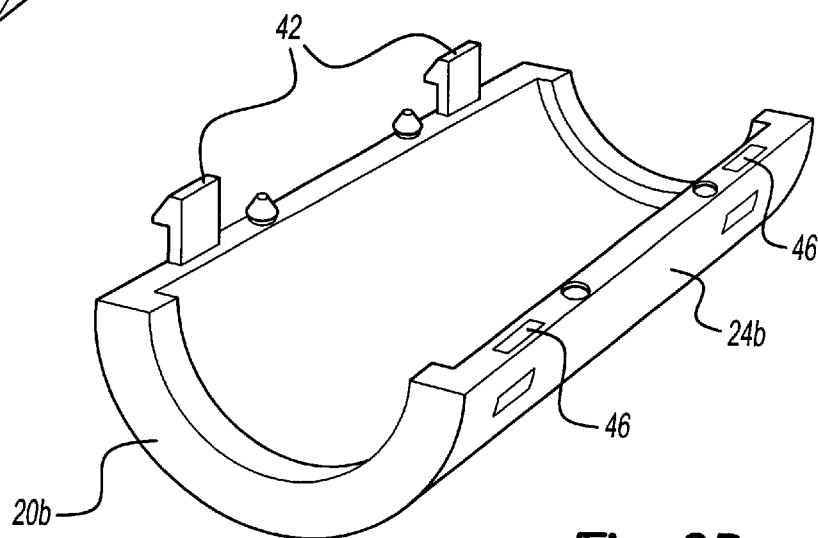
Figure 2C:
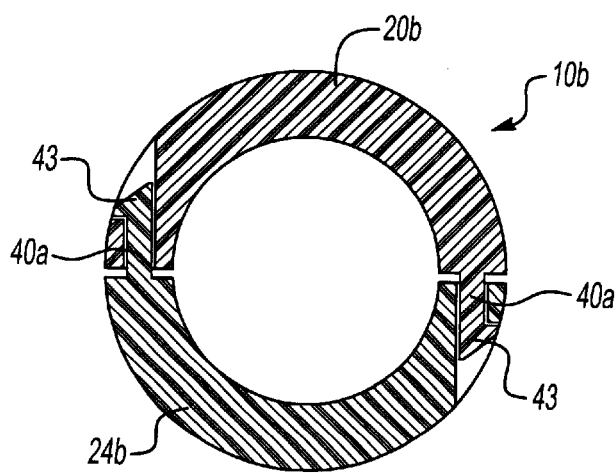
FIG. 2c is an end view of the showerhead security cover of FIG. 2a, the two half-shells being in secure engagement to each other.

Another series of preferred embodiments of the showerhead cover assembly 10B of the present invention comprises a pair of separate and distinct shells 22B and 24B, each shell having a semicircular shape as depicted in FIGS. 2a, 2b, and 2c. Preferably, each of the half shells is identical to the other for ease of manufacturing and assembly of the units.

The half shells 22B and 24B have generally the same configuration as the first embodiment of FIG. 1a and 1b, except there is no living hinge 50 joining the two shells 22B and 24B, and there being additional male and female fasteners 42 and 46 disposed on both side edges of each shell. The half shells 22B and 24B each have at least one male and female fastener on each opposing side edge for secure engagement with each other forming a snap closure during engagement.

Again, each lock 40A is integral with the housing 20A and includes a male fastener 42 and a female fastener 46. The male and female connectors are each disposed on opposing edges of the two shells 22A and 24A, the edges being parallel to the axis of the housing 20A. The male fastener 42 has an elongate body attached at one end of the shell, the male fasteners 42 extending in a tangential direction and being centrally disposed along the shell wall. The female fastener 46 has an elongate body attached at one end thereof, each female fastener 46 serving as a catch 47. The male and female fasteners are each integral with the pair of shells. A tongue 43 disposed near the end of the male fastener 42 engages a catch 47 disposed within the female fastener 46. During closure of the two shells 22A and 24A, each tongue 43 snaps into engagement with a catch 47.

FIG. 3a discloses yet another embodiment of the showerhead cover 10C of the present invention, which comprises a slip-on cover 10C that prevents access to the connector 12. The showerhead cover 10C can only be applied onto the connector 12 when the showerhead unit 14 is disconnected from the shower arm 11, preferably during installation. Both end views and a half-section view of the showerhead security cover 10C are shown. The cover 10C is one-piece and has a snap-closure engagement along both end walls which snaps-on and engage the side edges of the connector 12. The primary engagement that prevents unauthorized access to the connector 12 is between the downstream edge of the connector 12 and the corresponding side edge of the cover. A secondary engagement exists between the upstream edge of the connector 12 and the corresponding side edge of the cover 10C. The cover 10C is preferably undercut, being molded from cores on both ends of a tool. Other similar tools can also be used to produce the undercut configurations.

A variation of the embodiment of FIG. 3a is shown in FIG. 3b. The disclosure is an end view and a half-section view. Again the cover 10C' is of unitary construction. The cover 10C' has a snap-closure engagement on only one end wall for engagement with the downstream side edge of the connector 12. This cover 10C' is molded in a simple open or closed mold. The embodiments shown in FIGS. 3a, 3b, and 3c can only be installed by disassembling existing showerhead units or as new showerhead units are installed.

In the preferred embodiments of the showerhead security cover of the present invention, the cover is compatible with conventional shower units and no modification of the shower arm 11 or the connector 12 are needed—the showerhead security covers being sized to be compatible with the various sizes of connectors 12 that are commonly used.

FIGS. 4a, 4b, and 4c disclose variations of the preferred embodiment of the showerhead security cover of the present invention that enable authorized access to the connector 12 by knowing the configuration of the cover to dismember the cover. FIGS. 4a and 4b disclose one variation of the preferred embodiments of the showerhead security cover 10B of FIGS. 3a and 3b. One wall of the showerhead security cover 10D has a thinner section. A sharp object, enabling authorized removal from the connector 12 can cut the thinner section. The thinner section is hidden from unauthorized removal but is marked. FIG. 4c discloses another variation of the preferred embodiment of the removable showerhead security cover 10C of FIGS. 3a and 3b. Again, one wall of the cover 10D has a thinner section enabling authorized removal by tearing the cover 10D from the connector 12 along the thinner section by a common tool for plumbers, such as an Allen wrench. However, in each of these designs where authorized access is enabled, the cover 10D is destroyed during access and must be replaced.

The Patents referred to in this specification are for background purposes only, the complete specifications and drawings of which are incorporated herein by reference.

It is evident that many alternatives, modifications, and variations of the showerhead security cover of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A cover for preventing unauthorized access to a conventional connector of a shower assembly during engagement, the connector being attachable to a conventional shower arm by a threaded retention between an external thread and an internal thread, the connector being disposed downstream of the shower arm, the cover comprising:

a housing comprised of a pair of half shells secured together by a living hinge integral with the pair of shells enabling pivotal movement of one shell relative to the other shell that encases the connector preventing access to the connector during engagement, one end of the housing having an inwardly directed retaining lip for retention about a side edge of the connector, sufficient tolerance existing between the housing and the connector enabling rotational movement of the housing about the connector during engagement, the cover having sufficient strength that a grasping tool applied thereabout does not enable engagement with the connector;

a lock that is integral with the housing, the lock retaining the housing about the connector during engagement preventing substantial axial movement of the housing relative to the connector and any substantial rotational movement of the connector relative to the shower arm; and a disengagement member wherein the cover can be disengaged from engagement enabling removal with a special tool.

2. The cover of claim 1, wherein the shower arm is without modification and the connector is without modification.

3. The cover of claim 1, further comprising a second lock providing a snap-closure engagement on the opposite end wall of the housing.

4. The cover of claim 1, wherein the cover can be applied onto a pre-existing shower assembly without separating the shower arm from the connector.

5. The cover of claim 1, wherein mutilation of the housing is required to gain access to the connector.

6. The cover of claim 1, wherein the housing is a one-piece tubular member with a snap-closure engagement between an end-wall of the tubular member and an end-wall of the connector.

7. The cover of claim 1, wherein the housing comprises two shells, each shell having a generally semi-circular cross-section.

8. The cover of claim 7, each shell including a fastener member enabling a snap-closure engagement.

9. The cover of claim 1, wherein the housing includes a living hinge.

10. A cover for preventing unauthorized access to a conventional connector of a shower assembly during engagement, the connector being attachable to a conventional shower arm by a threaded retention between an external thread and an internal thread, the connector being disposed downstream of the shower arm, the cover comprised of a pair of half shells secured together by a living hinge integral with the pair of shells enabling pivotal movement of one shell relative to the other shell and encasing the connector preventing access to the connector during engagement, one end of the cover having an inwardly directed retaining lip for retention about a downstream side edge of the connector, sufficient tolerance existing between the cover and the connector enabling rotational movement of the cover about the connector during engagement, the cover having sufficient strength that a grasping tool applied thereabout does not enable engagement with the connector, the cover including a snap-closure engagement, the snap-closure engagement being integral with the cover, the snap-closure engagement being disposed during engagement on the downstream end wall of the connector, the cover being positioned about the connector during engagement preventing any substantial rearward movement of the cover relative to the connector axially and any substantial rotational movement of the connector relative to the shower arm.

11. The cover of claim 10, wherein mutilation of the housing is required to gain access to the connector.

12. The cover of claim 10, further comprising a second end of the cover having an inwardly directing retaining lip enabling retention of the cover about the upstream end wall of the connector.

13. A cover for preventing unauthorized access to a conventional connector of a shower assembly during engagement, the connector being attachable to a conventional shower arm by a threaded retention between an external thread and an internal thread, the connector being disposed downstream of the shower arm, the cover comprising:

a pair of shells secured together by a living hinge integral with the pair of shells enabling pivotal movement of one shell relative to the other shell, each shell having a generally semicircular cross section, the pair of shells encasing the connector preventing access to the connector during engagement, one end wall of the pair of shells having an inwardly directing retaining lip for retention about a side edge of the connector, sufficient tolerance existing between the pair of shells and the connector enabling rotational movement of the pair of shells about the connector during engagement, the pair of shells having sufficient strength that a grasping tool applied thereabout does not enable engagement with the connector;

a locking element that is integral with the pair of shells, the locking element retaining the pair of shells in a snap-closure engagement about the connector preventing substantial axial movement of the pair of shells relative to the connector and any substantial rotational movement of the connector relative to the shower arm; whereby the cover can be applied onto a pre-existing shower assembly without separating the shower arm from the connector; and a disengagement member wherein the cover can be disengaged from engagement enabling removal with a special tool.

14. The cover of claim 13, wherein the shower arm is without modification and the connector is without modification.

15. The cover of claim 13, further comprising a second lock providing a snap-closure engagement on the opposite end wall of the housing.

16. The cover of claim 13, wherein each of the pair of shells is substantially identical to the other.

17. A cover for preventing unauthorized access to a conventional connector of a shower assembly during engagement, the connector being attachable to a conventional shower arm by a threaded retention between an external thread and an internal thread, the connector being disposed downstream of the shower arm, the cover comprising:

a pair of shells, each shell having a generally semicircular cross section, the pair of shells encasing the connector preventing access to the connector during engagement, one end wall of the pair of shells having an inwardly directing retaining lip for retention about a side edge of the connector, sufficient tolerance existing between the pair of shells and the connector enabling rotational movement of the pair of shells about the connector during engagement, the pair of shells having sufficient strength that a grasping tool applied thereabout does not enable engagement with the connector;

a living hinge integral with the pair of shells, the living hinge enabling pivotal movement of one shell relative to the other shell;

a locking element that is integral with the pair of shells, the locking element retaining the pair of shells in a snap-closure engagement about the connector preventing substantial axial movement of the pair of shells relative to the connector and any substantial rotational movement of the connector relative to the shower arm; and a disengagement member wherein the cover can be disengaged from engagement enabling removal with a special tool.

18. The cover of claim 17, wherein the shower arm is without modification and the connector is without modification.

19. The cover of claim 17, further comprising a second lock providing a snap-closure engagement on the opposite end wall of the housing.

* * * * *